United States Patent [19]

Lew

[11] Patent Number: 5,022,269
[45] Date of Patent: Jun. 11, 1991

[54] RESONANCE FREQUENCY POSITION SENSOR

[76] Inventor: Hyok S. Lew, 7890 Oak St., Arvada, Colo. 80005

[21] Appl. No.: 456,723

[22] Filed: Dec. 26, 1989

[51] Int. Cl.$^5$ .................. G01L 11/00; G01L 13/02
[52] U.S. Cl. ................................ 73/702; 73/290 V; 73/717; 73/736
[58] Field of Search .................. 73/702, 704, 716, 736, 73/729, 717, 718, 722, 749, DIG. 1, 290 V, 517 A, 778, 862.59, 651, 700

[56] References Cited

U.S. PATENT DOCUMENTS

| 3,048,040 | 8/1962 | Pegram | 73/736 |
| 3,095,745 | 7/1963 | Kirwan | 73/736 |
| 3,208,281 | 9/1965 | Kalmus et al. | 73/290 V |
| 3,372,592 | 3/1968 | Gravert | 73/290 V |
| 4,305,283 | 12/1981 | Redding | 73/290 V |
| 4,337,656 | 7/1982 | Rapp | 73/290 V |
| 4,839,590 | 6/1989 | Koski et al. | 73/290 V |

Primary Examiner—Donald O. Woodiel

[57] ABSTRACT

A position sensor includes a vibrating elongated member with a marker retained thereto in a sliding relationship thereon, wherein the marker coupled to a displacement of a target corresponding to a change of a physical quantity alters the natural frequency of the vibrating elongated member and, consequently, the numerical value of the physical quantity is determined from the natural frequency of the vibrating elongated member.

13 Claims, 3 Drawing Sheets

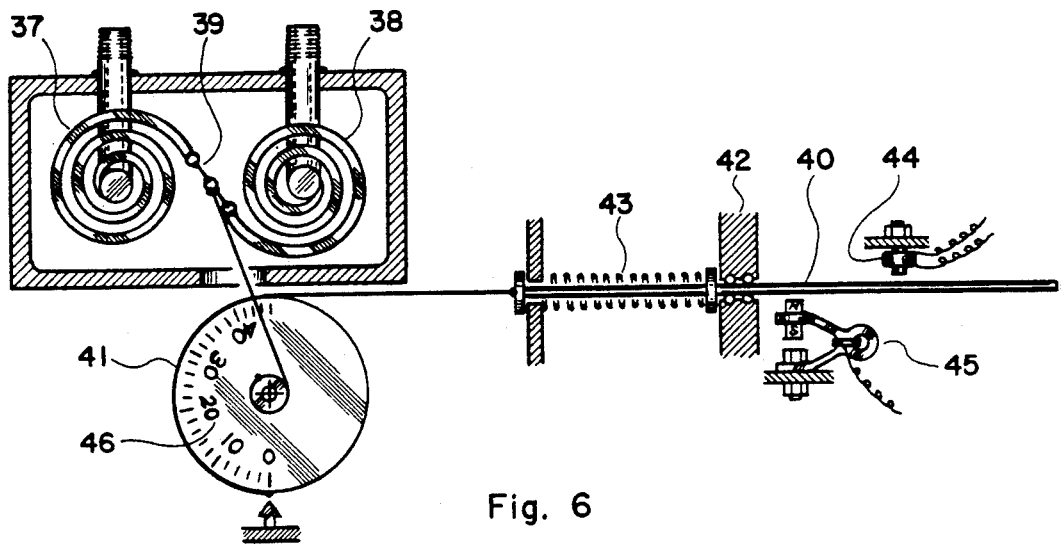
Fig. 6
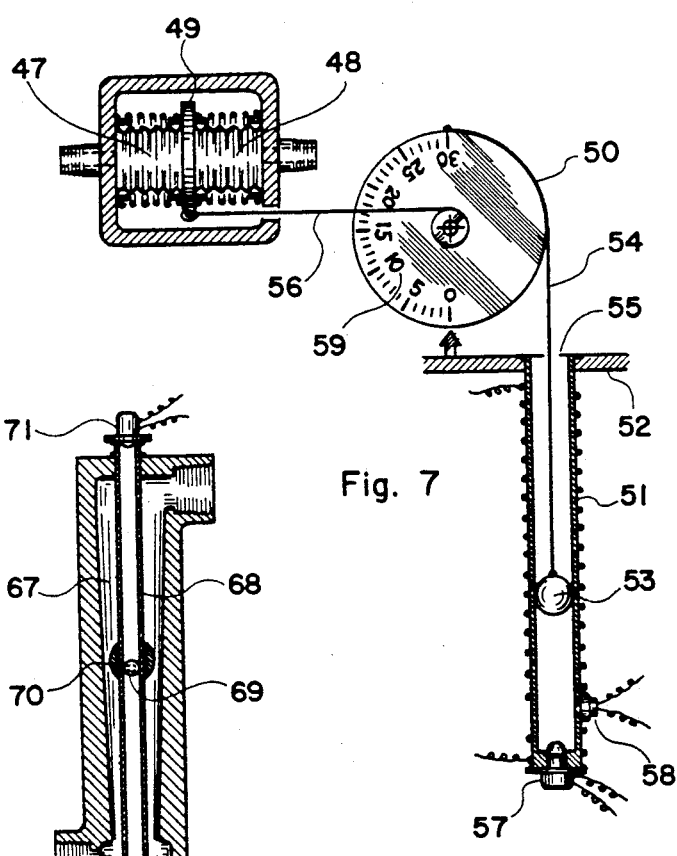
Fig. 7
Fig. 9
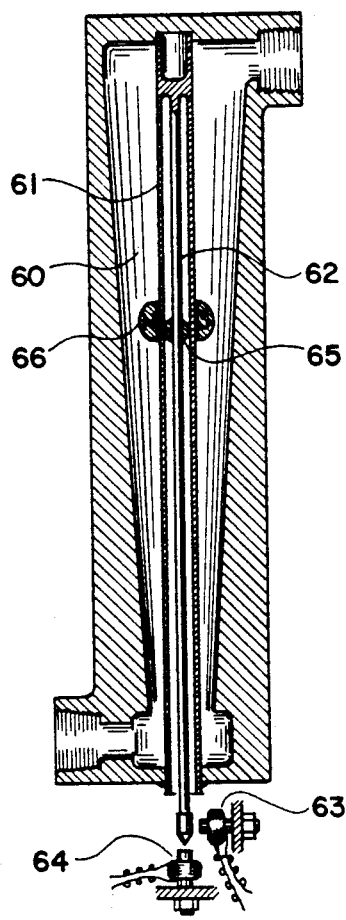
Fig. 8

RESONANCE FREQUENCY POSITION SENSOR

BACKGROUND OF THE INVENTION

In the field of instrumentation and control, there is a great demand for a position transducer that converts the position of a target or marker disposed on one side of rigid structural barrier to an electrical signal generated and processed by an electrical transducer element and circuitry disposed on the otherside of the rigid structural barrier. This type of position transducer enables one to modify many existing measuring instruments with visual read-out means such as pressure gauges, thermometers, level indicators, flowmeters, etc. whereby the information provided by those measuring instruments is converted to an electrical signal that is processed by an electronic data processor or computer in acquiring measurement data in a desired physical unit and feeding it to other control devices for process control.

BRIEF SUMMARY OF THE INVENTION

The primary object of the present invention is to provide a mechanical arrangement including a vibrating element that has a natural frequency of vibration varying as a function of the location of a target or marker indicating the position under measurement, and an electrical transducer that converts the mechanical vibration of the vibrating element to an alternating electrical signal; whereby the position of the target or marker is measured by detecting the natural frequency of the vibrating element.

Another object is to provide a digital position transducer that measures continuously varying positions of a target or marker in a digitized signal.

A further object is to provide a position sensor including a vibrating elongated member with slidable mass following the position of a target or marker under measurement, wherein the natural frequency of the vibrating elongated member depends on the location of the sliding mass thereon and thus provides the information on the position of the target or marker.

A further object is to provide a position transducer comprising a vibrating elongated member with a sliding support wherein the length of the actual vibrating section of the vibrating elongated member varies as the sliding support thereof follows the position of a target or marker and, consequently, the resonance frequency thereof varies as a function of the a function of the target or marker.

Yet another object is to provide a position transducer including a vibrating elongated member secured to a support in a sliding relationship wherein the vibrating elongated member slides into and out of the support following the position of a target or marker, whereby the natural frequency of the flexural vibration of the vibrating elongated member represents the position of the target or marker.

Yet a further object is to provide a position sensor including an elongated hollow cylinder and a movable blockage such as a solid mass filling up the cross section of the elongated hollow cylinder or a liquid column occupying the inner space within the hollow cylinder starting from the lower extremity thereof; an aconstic wave generator disposed at one extremity of the elongated hollow cylinder; and an aconstic wave detector; wherein the position of the blockage or the liquid-air interface following the position of a target or marker varies the resonance frequency of the air column contained in the elongated hollow cylinder that represents the position of the target o Still another object is to provide a position sensor wherein the position of a target or marker and the position of the sliding mass, sliding support, sliding elongated vibrating member or the blockage are coupled to one another by a mechanical linking means.

Still a further object is to provide a position sensor wherein the position of a target or marker and the position of the sliding mass, sliding support, sliding elongated member, or the blockage are coupled to one another by a magnetic motion coupling means.

Yet still another object is to provide a liquid column manometer wherein the position of the liquid-gas interface is determined from the resonance frequency of a section of a vibrating elongated member extending above the liquid-gas interface or the resonance frequency of a gas column contained in the manometer tube intermediate the top extremity thereof and the liquid-gas interface.

Yet still a further object is to provide a level sensor wherein the position of a liquid level is determined from the resonance frequency of a section of a vibrating elongated member extending above the liquid level or resonance frequency of a gas column contained in an elongated tubular member with the bottom end submerged in and open to the liquid and extending above the liquid level.

An additional object of the present invention is to construct pressure sensors, thermal sensors, flowmeters and level sensors with digital read-outs by employing the position sensing technologies taught by the present invention.

These and other objects of the present invention will become clear as the description thereof progresses.

BRIEF DESCRIPTION OF THE FIGURES

The present invention may be described with a greater clarity and specificity by referring to the following figures:

FIG. 6 illustrates another embodiment of the differential pressure sensor comprising a combination of two spiral bourdon tubes and a resonance frequency position sensor mechanically coupled to the displacement of the combination of the two spiral bourdon tubes.

FIG. 7 illustrates a further embodiment of the differential pressure sensor employing a combination of two bellows and a resonance frequency position sensor mechanically coupled to the expansion and contraction of the combination of the two bellows.

FIG. 8 illustrates an embodiment of the resonance frequency position sensor employed in construction of a rotameter, that includes a vibrating elongated member with a sliding mass or sliding support magnetically coupled to the displacement of a fluid dynamic target disposed in the fluid stream through a graduated flow passage, wherein the position of the fluid dynamic target is determined from the resonance frequency of the flexural vibration of the vibrating elongated member.

FIG. 9 illustrates another embodiment of the resonance frequency position sensor employed in construction of a rotameter that includes an elongated hollow cylindrical member with a moving blockage magnetically coupled to the displacement of a fluid dynamic target disposed in a graduated flow passage, wherein the position of the fluid dynamic target is determined from the resonance frequency of the gas column in the elongated cylindrical member.

DESCRIPTION OF THE ILLUSTRATED EMBODIMENTS

Figure 1:
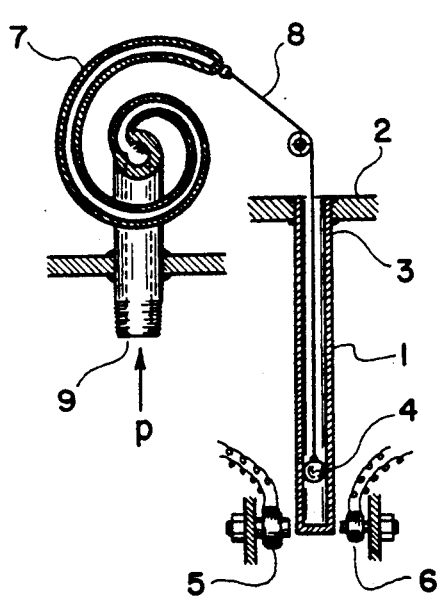
FIG. 1 illustrates an embodiment of the resonance frequency position sensor employing a vibrating elongted hollow member and a sliding mass contained therein and mechanically coupled to a spiral bourdon tube for pressure measurements; wherein a vibration sensor detects the resonance frequency of the flexural vibration of the vibrating elongated member.

In FIG. 1 there is illustrated an embodiment of the resonance frequency position sensor of the present invention, that is employed in construction of a pressure sensor. The resonance frequency position sensor includes an elongated hollow cylindrical member 1 fixedly anchored to a support 2 at one extremity 3 thereof, and a sliding mass 4 with a cross section closely matched to that of the cylindrical cavity included in the elongated hollow cylindrical member 1, wherein the sliding mass 4 is movable following the length of the elongated hollow cylindrical member 1. An electromagnetic vibrator 5 induces a flexural vibration of the elongated hollow cylindrical member 1 and an inductive motion sensor 6 detects the flexural vibration. The sliding mass 4 is connected to a pressure sensing device such as a spiral bourdon tube 7 by a flexible cord 8. The fluid pressure introduced into the bourdon tube 7 through the pressure port 9 uncoils the bourdon tube 7 and lifts up the sliding mass 4 in proportion to the magnitude of the pressure. When the pressure is reduced, the bourdon tube 7 coils back and the sliding mass 4 lowers itself by the weight thereof. The natural frequency of the flexural vibration of the elongated hollow cylindrical member varies as a function of the relative position of the sliding mass 4 with respect to the fixed extremity 3 of the elongated hollow cylindrical member 1. As a consequence, the degree of uncoiling and coiling of the bourdon tube 7 changes the natural frequency of the flexural vibration of the elongated hollow cylindrical member 1. In other words, the pressure can be determined from the natural frequency of the flexural vibration fed into a data processor or computer that executes an algorithm defining the functional relationship between the pressure and the natural frequency, which relationship is determined empirically and stored in the data processor or computer. There are three different ways for detecting the natural frequency of the elongated hollow cylindrical member. Firstly, the electromagnetic vibrator 5 induces natural flexural vibration by exerting a force intermittently on the elongated hollow cylindrical member 1 and the motion sensor 6 detects the frequency of the natural flexural vibration so induced. Secondly, the electromagnetic vibrator exerts a vibratory force on the elongated hollow cylindrical member 1 in a frequency sweep mode and the frequency resulting in the maximum amplitude of the flexural vibration of the elongated hollow cylindrical member 1 is taken as the natural frequency. Thirdly, the frequency of alternating electric current energizing the electromagnetic vibrator 5 is controlled based on the feed back from the motion sensor 6 in such a way that the maximum amplitude is maintained, wherein the frequency of the energizing current generating the flexural vibration of maximum amplitude is equal to the natural frequency. One of these three methods for determining the natural or resonance frequency can be applied to all other embodiments of the resonance frequency position sensor shown as the illustrative embodiments. In place of the particular embodiment of the resonance frequency position sensor shown in FIG. 1, other illustrated embodiments of the resonance frequency position sensor shown in other figures can be employed in constructing a pressure sensor. It should be mentioned that different embodiments of the resonance frequency sensors shown in different figures are interchangeable in constructing various measuring apparatus shown as illustrative examples of the application of the resonance frequency position sensor. It should be mentioned that, when the spiral bourdon tube 7 is replaced by a bimetal spiral coil, the embodiment shown in FIG. 1 becomes a thermometer.

Figure 2:
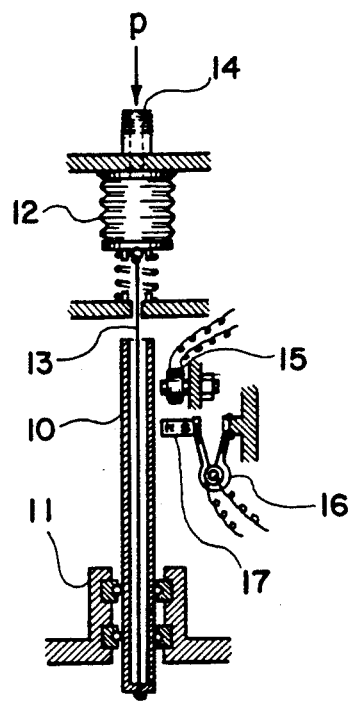
FIG. 2 illustrates another embodiment of the resonance frequency position sensor comprising a vibrating elongated member supported at one extremity thereof in a sliding arrangement and a vibration sensor; wherein the vibrating elongated member is mechanically coupled to a bellow for pressure measurements.

In FIG. 2 there is illustrated another embodiment of the resonance frequency position sensor, that is employed in construction of another pressure sensor. An elongated member 10 supported by a support 11 in a slidable arrangement is connected to a bellow 12 by a cord 13. The pressure supplied to the pressure port 14 expands and contracts the bellow 12 and, consequently, changes the length of over-hanging portion of the elongated member 10. As the natural frequency of the flexural vibration induced by the electromagnetic vibrator 15 varies as a function of the length of the over-hanging section of the elongated member 10, the pressure supplied to the bellow 12 can be determined from the resonance frequency detected by means of the Piezo electric motion sensor 16 that includes a magnet 17 transmitting the flexural vibration of the elongated member 10 made of a ferromagnetic material.

Figure 3:
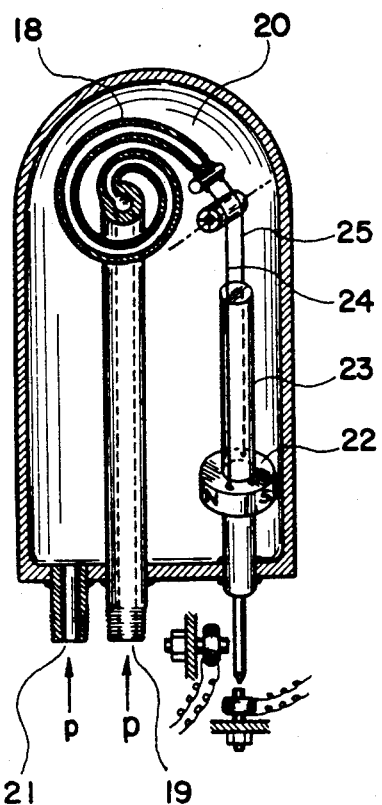
FIG. 3 illustrates an embodiment of the differential pressure sensor employing a resonance frequency position sensor taught by the present invention.

In FIG. 3 there is illustrated an embodiment of the differential pressure sensor that measures the difference between two pressures respectively supplied to the bourdon tube 18 through a first pressure port 19 and the ambient pressure chamber 20 through a second pressure port 21. The tip of the bourdon tube 18 is connected to a magnetic ring 22 sliding along a rigid tube 23 containing a resonance frequency position sensor by a pair of cords 24 and 25. The bourdon tube 18 may be replaced with bellow such as the element 12 shown in FIG. 2 in constructing the differential pressure sensor shown in FIG. 3.

Figures 4, 5:
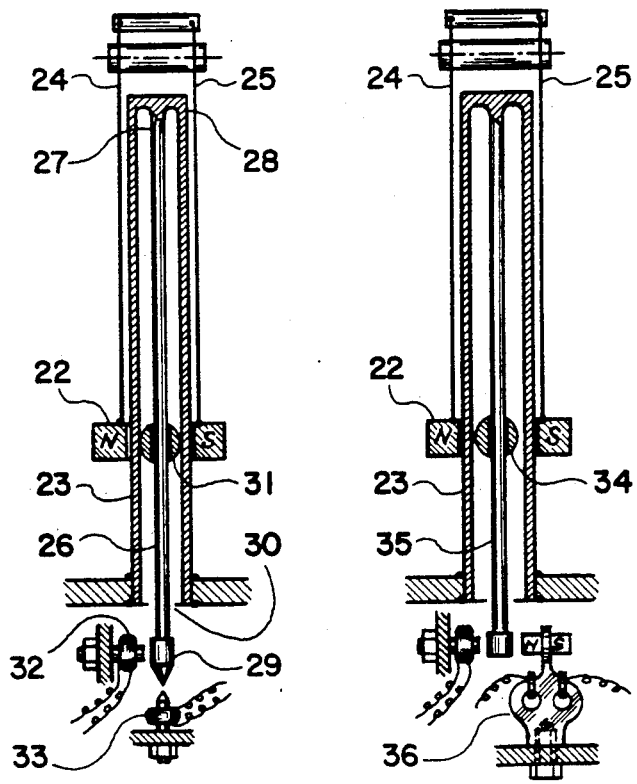
FIG. 4 illustrates an embodiment of the resonance frequency position sensor employed in the differential pressure sensor shown in FIG. 3, that includes a vibrating elongated member with a sliding support magnetically coupled to a pressure sensing element such as a spiral bourdon tube or bellow, and a vibration sensor detecting the resonance frequency of the flexural vibration of the elongated vibrating member.
FIG. 5 illustrates another embodiment of the resonance frequency position sensor employed in the differential pressure sensor shown in FIG. 3, that employs a vibrating elongated member with a sliding mass magnetically coupled to a spiral bourdon tube or a bellow, and a vibration sensor detecting the resonance frequency of the flexural vibration of the vibrating elongated member.

In FIG. 4 there is illustrated a cross section of an embodiment of the resonance frequency position sensor that can be included within the rigid tube 23 shown in FIG. 3. An elongated member 26 is disposed within the rigid tube 23 in a parallel and isolated arrangement, wherein one extremity 27 thereof is anchored to the closed extremity 28 of the rigid tube 23, while the other extremity with a ferromagnetic member 29 affixed thereto extends through the open extremity 30 of the rigid tube 23. A sliding support 31 made of a ferromagnetic material, that has a cross section closely matched to the inner cross section of the rigid tube 23 is disposed within the rigid tube 23 in a slidable relationship. The sliding support 31 has a hole closely matched to the cross section of the elongated member 26 that is engaged by the elongated member 26 in a sliding relationship. The sliding support 31 follows the magnetic ring 22 mechanically connected to a pressure sensing device such as a bourdon tube or a bellow. The electromagnetic vibrator 32 generates a flexural vibration of the over-hanging section of the elongated member 26 supported by the sliding support 31, and the motion sensor 33 detects the flexural vibration. The differential value of the pressure is determined from the natural frequency of the flexural vibration of the over-hanging section of the elongated member 26.

In FIG. 5 there is illustrated a cross section of another embodiment of the resonance frequency position sensor that can be included in the rigid tube 23 shown in FIG. 3, which resonance frequency position sensor has essentially the same construction as that shown in FIG. 4 with two exceptions. Firstly, the sliding mass 34 replacing the sliding support 31 shown in FIG. 4 is isolated from the inner wall of the rigid tube 23, while it is slidable following the elongated member 35 with little relative lateral movement therebetween. Secondly, the Piezo electric motion sensor 36 replaces the inductive motion sensor 33 shown in FIG. 4.

In FIG. 6 there is illustrated another embodiment of the differential pressure sensor employing one of the embodiments of the resonance frequency position sensors shown in FIG. 1, 2, 4 and 5. A pair of bourdon tubes 37 and 38 are disposed in an off-centered and axisymmetric arrangement about the tips thereof linked to one another by a flexible mechanical coupling 39, which coupling is connected to an elongated member 40 via a motion amplifying means 41 such as a leveraged wheel or arm. The elongated member 40 is supported by a support 42 in a sliding relationship. A coil spring 43 returns the elongated member 40 to the fully extended position when there is no difference between the two pressures respectively supplied to the two bourdon tubes 37 and 38. The electromagnetic vibrator 44 induces a flexural vibration of the elongated member 40 and the Piezo electric motion sensor 45 detects the flexural vibration from which the natural frequency is determined. The differential pressure is calculated from the natural frequency of the flexural vibration of the elongated member 40. Other embodiments of the resonance frequency position sensor shown in FIGS. 1, 2, 4 and 5 may be employed in place of the particular embodiment of the resonance frequecny position sensor shown. In addition to or in place of the resonance frequency position sensor, a visual dial or needle gauge 46 may be provided.

In FIG. 7 there is illustrated a further embodiment of the differential pressure sensor employing another version of the resonance frequency position sensors. A pair of bellows 47 and 48 are disposed in series wherein a divider plate 49 disposed intermediate the two bellows 47 and 48 is connected to a resonance frequency position sensor via a motion amplifying means. This resonance frequency position sensor includes a rigid tube 51 fixedly secured to a support 52, and a plug 53 with a cross section closely matched to the inner cross section of the rigid tube 51, which plug is disposed within the rigid tube 51 in a movable arrangement and connected to the divider plate 49 via the motion amplifying means 50 by a first cord 54 extending through an open end 55 of the rigid tube 51 and a second cord 56 anchored to the divider plate 49. The other extremity of the rigid tube 51 opposite to the open extremity 55 includes a sound wave generator 57. A sound sensor or microphone 58 detects the sound waves, from which the natural frequency of the air column occupying the space in the rigid tube 51 between the sound wave generator 51 and the plug 53 is obtained. The pressure difference between the two bellows 47 and 48 is determined from the resonance frequency of the air column. The acoustic resonance frequency position sensor shown in FIG. 7 may be replaced by other resonance frequency position sensors such as that shown in FIG. 1, 2, 4, 5 or 6. In addition to or in place of the resonance frequency position sensor, a visual dial or needle gauge 59 may be included. The temperature of the air column contained in the rigid tube 52 may be maintained at a constant temperature by a heating coil wound on the rigid tube 52. It should be mentioned that the mathematical relationship between the differential pressure and the natural or resonance frequency must be determined empirically and stored in a data processor or computer that executes the algorithm converting the natural or resonance frequency to the differential pressure. The embodiments of the differential pressure sensor shown in FIGS. 6 and 7 have an advantage over that shown in FIG. 3, as both of the two pressures are contained in the two bourdon tubes or bellows in the former embodiments and, consequently, a direct mechanical coupling from the differential pressure sensing element to a resonance frequency position sensor or visual gauge is allowed.

In FIG. 8 there is illustrated a cross section of an embodiment of a rotameter including a tapered flow passage disposed in an up-right arrangement and a rigid tube 61 made of nonmagnetic material disposed coaxially within the tapered flow passage. The interior space of the rigid tube 61 isolated from the tapered flow passage includes an elongated structural member 62 coaxially disposed therein, which elongated structural member 62 is anchored to the wall of the rigid tube 61 at one extremity thereof, while the other extremity opposite to the anchored extremity extends through an open end of the rigid tube and is terminated at a close proximity to the electromagnetic vibrator 63 and a motion sensor 64. A sliding support or sliding mass 65 of ferromagnetic material respectively having the constructions and functions described in conjunction with FIGS. 4 and 5 slides on the elongated member 62. A fluid dynamic target 66 of toroidal shape with a magnet is disposed in a free-sliding arrangement following the rigid tube. The drag force experienced by the fluid dynamic target 66 raises the fluid dynamic target to a varying vertical position. The sliding support or sliding mass 65 moves with the fluid dynamic target 66 because of the magnetic attractive force therebetween. As the drag force on the fluid dynamic target 66 is proportional to the dynamic pressure of the fluid flow, that is equal to one half of the fluid density times the square of the fluid velocity, and the magnitude of the drag force is represented by the vertical position of the sliding support or sliding mass 65, the dynamic pressure of the fluid flow is determined from the natural frequency of the flexural vibration of the elongated member 62. If the fluid flowing through the flow passage 60 is a gaseous medium, the rigid tube 61 and the fluid dynamic target may be omitted and the anchored extremity of the elongated member 62 can be secured directly to the upper extremity of the body of the rotameter, while the over-hanging extremity of the elongated member 62 is enclosed within a thin-walled cap made of nonmagnetic material and affixed to the lower extremity of the rotameter body in a leak-proof manner, which cap provides a leak-proof barrier confining the gaseous fluid therewithin and away from the electromagnetic vibrator 63 and the motion sensor 64. Of course, the sliding mass 65 now enlarged in size plays the dual roles of the fluid dynamic target and the sliding mass.

In FIG. 9 there is illustrated a cross section of another ambodiment of the rotameter, that includes a tapered flow passage 67 and a rigid tube 68 coaxially disposed therein, which rigid tube extends through and out of the two extremities of the rotameter body and is anchored thereto. The sliding pulg 69 of ferromagnetic material filling up the cross section of the rigid tube 68 in a close tolerance follows the fluid dynamic target 70 with a magnet. One extremity of the rigid tube 68 includes a sound wave generator 71, while the other extremity has a sound sensor or microphone 72. The dynamic pressure of the fluid flow is determined from the resonance frequency of the air column contained within the rigid tube 68 intermediate the sound generator 71 and the plug 69. The mathematical relationship between the dynamic pressure of the fluid flow and the natural or resonance frequency employed in the operation of the rotameters shown in FIGS. 8 and 9 must be determined empirically and stored in a data processor or computer executing the altorithm of the mathematical relationship.

Figures 10, 11, 13:
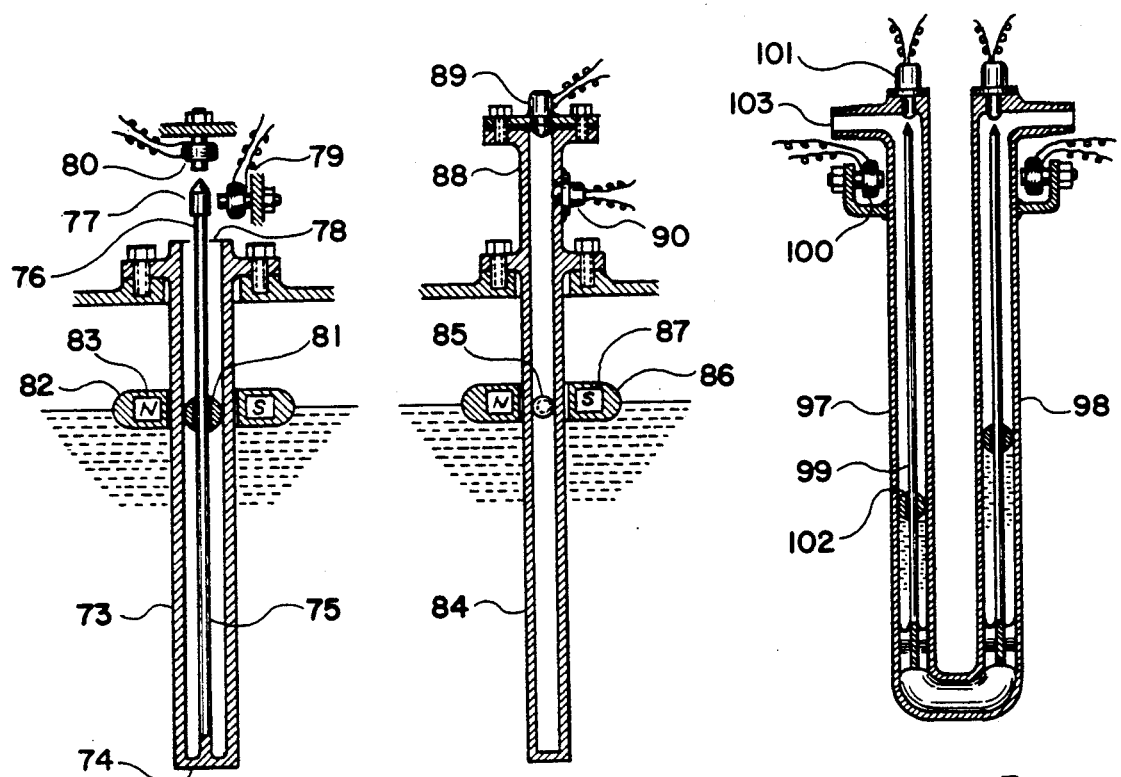
FIG. 10 illustrates an embodiment of the resonance frequency position sensor employed in construction of a level sensor, that includes a vibrating elongated member with a sliding mass or sliding support magnetically coupled to a float floating at the free surface of the liquid, wherein the fluid level is determined from the resonance frequency of the flexural vibration of the vibrating elongated member.
FIG. 11 illustrates another embodiment of the resonance frequency position sensor employed in construction of a level sensor, that includes an elongated hollow cylindrical member with a moving blockage magnetically coupled to a float, wherein the fluid level is determined from the resonance frequency of the gas column in the elongated hollow cylindrical member.
FIG. 13 illustrates another embodiment of the differential pressure manometer including a U-shaped tubular member, wherein each leg of the U-shaped tubular member has a vibrating elongated member disposed therein in a parallel and isolated arrangement, that is fixedly anchored at the U-shaped extremity of the tubular member and has a sliding support floating at the top of the liquid column, and a vibration sensor detecting flexural vibration of the vibrating elongated member.

In FIG. 10 there is illustrated a cross section of an embodiment of the liquid level sensor including a resonance frequency position sensor, which includes a rigid tube 73 with a closed extremity 74 extending into a liquid medium, that includes an elongated member 75 with one extremity anchored to the closed end 74 of the rigid tube 73, that is coaxially disposed within the rigid tube 73. The other extremity 76 including a ferromagnetic element 77 extends through the open end 78 of the rigid tube 73 and is terminated at a close proximity to the electromagnetic vibrator 79 and a motion sensor 90. A sliding support 81 having the same construction and function described in conjunction with the element 31 shown in FIG. 4 and made of a ferromagnetic material fills up the annular space between the wall of the rigid tube 73 and the elongated member 75, which sliding support 81 follows the float 82 including a magnet 83 that slides on the rigid tube 73 as the float moves with the rising or receding free surface of the liquid medium. The fluid level is determined from the natural frequency of the flexural vibration of the section of the elongated member 75, which section over-hangs from the sliding support 81. If the liquid medium is a clear and nonfouling liquid, the closed bottom 74 of the rigid tube 73 may be provided with an opening and the sliding support 81 is made of a buoyant material so that it floats at the free surface of the liquid column now penetrated into the inner space of the rigid tube. In such a modified version of the level sensor, the float 82 with a magnet 83 may be omitted.

In FIG. 11 there is illustrated a cross section of another embodiment of the level sensor employing a resonance frequency position sensor, that includes a rigid tube with a closed extremity extending into a liquid medium. A plug 85 filling up the cross section of the internal space of the rigid tube 84 in a close tolerance is disposed in a slidable arrangement, which plug 85 made of a ferromagnetic material follows the float 86 with a magnet 87. The upper extremity 8 of the rigid tube 84 includes a sound wave generator 89 and a sound sensor or microphone 90. The liquid level is determined from the resonance frequency of the air column contained in the rigid tube 84 intermediate the plug 85 and the sound generator 89. When the liquid medium is a clear and nonfouling liquid, the closed bottom end of the rigid tube 84 may be opened up and the plug 85 is made of a bouyant material that floats at the free surface of the liquid column in the rigid tube, or the plug 85 as well as the float 86 with magnet 87 may be eliminated. The mathematical relationship between the liquid level and the natural or resonance frequency must be determined empirically and stored in a data processor or computer executing the algorithm of the mathematical relationship in the operation of the level sensor shown in FIG. 10 or 11.

Figure 12:
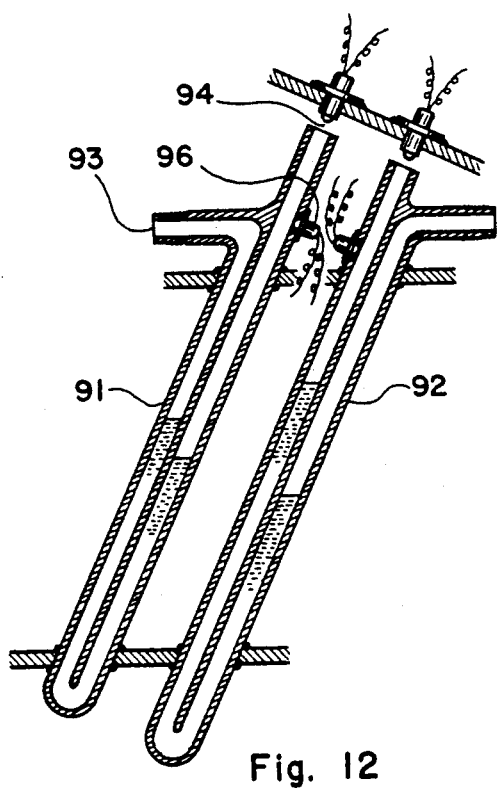
FIG. 12 illustrates an embodiment of the differential pressure manometer comprising a pair of U-shaped tubular members partially filled with a liquid, wherein each of the two U shaped tubular members includes a sonic wave generator disposed at one extremity thereof, a pressure port disposed at the other extremity and a microphone detecting the sound waves.

In FIG. 12 there is illustrated a cross section of an embodiment of the differential pressure manometer employing a pair of resonance frequency position sensors, that includes a pair of U-shaped tubes 91 and 92 of identical construction containing equal amounts of liquid column resting at the U-shaped bottom thereof. Each of the two U-shaped tubes 91 and 92 includes a first extremity 93 open to one of the two pressures under measurement and a second extremity 94 open to the ambient air pressure, which extremity 94 includes a sound wave generator 95 and a sound detector or microphone 96. The gauge pressure value of the pressure connected to the pressure port 93 included in the first leg of the U-shaped tube is determined from the resonance frequency of the air column contained in the second leg of the U-shaped tube intermediate the air-liquid interface and the extremity 94 open to the ambient air pressure. The differential value of the two pressures respectively connected to the two U-shaped tubes 91 and 92 is determined as a function of the two resonance frequencies of the air columns contained in the second legs of the two U-shaped tubes. It is clear that only one U-shaped conduit and accessories attached thereto is required if the value of pressure under measurement is a gauge pressure of a single pressure source instead of a differential pressure between to pressure sources.

In FIG. 13 there is illustrated a cross section of another embodiment of the differential pressure manometer which inlcudes a U-shaped tube with a liquid column resting at the U-shaped bottom thereof. Each of the two legs 97 and 98 of the U-shaped tube includes an elongated member 99 coaxially disposed therein and anchored to the wall of the U-shaped tube at the bottom extremity thereof, wherein the unsupported upper extremity is terminated at a close proximity to the electromagnetic vibrator 100 and a motion sensor 101. A bouyant sliding support floating at the top of the liquid column that has the same construction and function as the element 31 shown in FIG. 4 slides along the length of the combination of the rigid tubular leg 97 and the elongated member 99 following the free surface of the liquid column. The top extremity 103 of the rigid tubular leg 97 is to be connected to one of the two pressure sources under measurement. The pressure connected to the pressure port 103 or the height of the liquid column represented by the sliding support 102 is determined from the resonance frequency of the lateral flexural vibration of a section of the elongated member 99, which section is extending above the sliding support 102. The differential value between two pressures respectively connected to the two legs 97 and 98 of the U-shaped tube is determined from the two natural frequencies associated with the two elongated members respectively included in the two legs 97 and 98. When one of the two pressure ports is open to the ambient air pressure and the other is connected to a pressure source, the differential pressure manometer measures a gauge pressure value of that pressure source.

Figure 14:
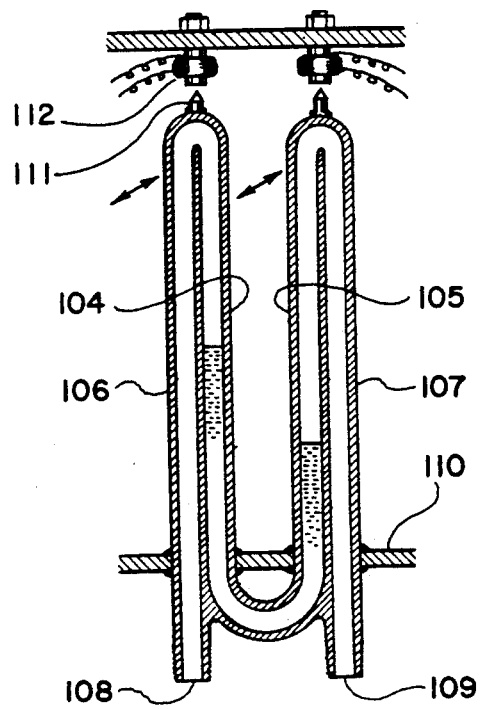
FIG. 14 illustrates a further embodiment of the differential pressure nanometer comprising a U-shaped combination of two U-shaped tubular members, wherein the height of the liquid column contained in each of the two U-shaped tubular members is determined from the resonance frequency thereof.

In FIG. 14 there is illustrated a cross section of a further embodiment of the differential pressure manometer that employs a pair of tubes 104 and 105 connected to one another at the bottom extremities thereof, while the top extremities are respectively connected to two tubes 106 and 107 respectively disposed parallel and adjacent to the two tubes 104 and 105. As a consequence, the combination of the tubes 104 and 106, and the combination of the tubes 105 and 107 constitute a pair of legs in a U-shaped arrangement of tubes with two openings 108 and 109 disposed adjacent to the U-shaped junction of the two tubes 104 and 105, wherein the two legs of the U-shaped arrangement of the tubes are fixedly anchored to a support 110 at sections thereof adjacent to the U-shaped junction of the two tubes 104 and 105. Each of the two legs extending from the support 110 in a cantilever arrangement includes a ferromagnetic element 111 affixed to the unsupported end thereof, an electromagnetic vibrator inducing a flexural vibration of the leg in a direction perpendicular to a plane including the central axes of the two tubes included in that leg, and a motion sensor 112 detecting the flexural vibration of that leg. The difference between two pressures respectively connected to the two open ends 108 and 109 of the tube assembly is proportional to the difference in the height of the liquid columns in the two tubes 104 and 105. As the height of the liquid column in each of the two tubes 104 and 105 can be determined from the natural frequency of the flexural vibration thereof, the pressure difference between the two pressures respectively connected to the two pressure ports 108 and 109 can be determined as a function of the two natural frequencies. The mathematical relationship between the differential pressure and the two natural frequencies must be determined empirically and stored in a data processor or computer executing the algorithm of the mathematical relationship in the operation of the manometers shown in FIGS. 12, 13 and 14.

While the principles of the present inventions have now been made clear by the illustrative embodiments, there will be many modifications of the structures, arrangements, proportions, elements and materials immediately obvious to those skilled in the art, which are particularly adapted to the specific working environments and operating conditions in the practice of the invention without departing from those principles. It is not desired to limit the inventions to the particular illustrative embodiments shown and described and, accordingly, all suitable modifications and equivalents may be regarded as falling within the scope of the invention as defined by the claims which follow.

The embodiments of the invention, in which an exclusive property or priviledge is claimed, are defined as follows:

1. A device for measuring position of a target comprising in combination:
    a) an elongated member supported by a support in a slidable arrangement in lengthwise directions of said elongated member, wherein a flexural vibration of said elongated member occurs at a natural frequency that is a function of relative position of the support with respect to said elongated member;
    b) means for coupling displacement of one member of the combination of said elongated member and said support relative to the other member of the combination of said elongated member and said support to displacement of a target corresponding to a measure of a physical quantity;
    c) means for inducing the flexural vibration of said elongated member; and
    d) means for detecting the natural frequency of the flexural vibration of said elongated member as a measure of relative position between said elongated member and said support.

2. The combination as set forth in claim 1 wherein said means for coupling comprises a mechanical coupling linking the displacement of one member of the combination of said elongated member and said support to the displacement of said target.

3. The combination as set forth in claim 1 wherein said means for coupling comprises a magnetic coupling that couples the displacement of one member of the combination of said elongated member and said support to the displacement of said target by a magnetic force from a magnet included in one member of the combination of said one member of the elongated member and the support, and said target.

4. The combination as set forth in claim 1 wherein said means for coupling comprises a bouyancy force floating said one member of the combination of the elongated member and the support at a free surface of a liquid medium, said free surface being said target.

5. The combination as set forth in claim 1 wherein lengthwise sliding displacement of the elongated member relative to the support is coupled to the displacement of the target by said means for coupling, and said support is secured to a stationary structure.

6. The combination as set forth in claim 1 wherein sliding displacement of said support along said elongated member is coupled to the displacement of the target, and at least one extremity of said elongated member is secured to a stationary structure.

7. The combination as set forth in claim 6 wherein said combination includes a rigid elongated guide member disposed parallel to said elongated member, that guides the sliding displacement of said support along said elongated member and supports said support against vibration.

8. A device for measuring position of a target comprising in combination:
a) a tubular member secured to a stationary structure;
b) a plug disposed within said tubular member in a slidable arrangement, wherein said plug substantially plugs up the tubular member with a minimum clearance therebetween allowing the sliding movement;
c) means for coupling sliding displacement of said plug along the tubular member to a displacement of a target corresponding to a measure of a physical quantity;
d) means for generating sound waves in a fluid column contained in said tubular member intermediate one extremity of said tubular member and said plug, said means for generating sound waves disposed at said one extremity of the tubular member; and
e) means for detecting resonance frequency of sound waves in said fluid column as a measure of position of said plug.

9. The combination as set forth in claim 8 wherein said means for coupling comprises a mechanical coupling linking the displacements of the plug and the target to one another.

10. The combination as set forth in claim 8 wherein said means for coupling comprises a magnetic coupling that couples the displacements of the plug and the target to one another by a magnetic force from a magnet included in one member of the combination of the plug and target.

11. The combination as set forth in claim 8 wherein said means for coupling comprises a bouyancy force floating the plug at a free surface of a liquid medium, said free surface being said target.

12. A device for measuring pressure comprising in combination:
a) a first elongated member secured to a support at one extremity and extending from said support, said first elongated member including a pair of elongated cavities parallel to the lengthwise direction of said first elongated member, wherein first extremities of the pair of elongated cavities adjacent to the other extremity of the first elongated member opposite to said one extremity are connected to one another;
b) a second elongated member secured to the support at one extremity and extending from said support in a generally parallel relationship with respect to said first elongated member, said second elongated member including a pair of elongated cavities parallel to the lengthwise direction of said second elongated member, wherein first extremities of the pair of elongated cavities adjacent to the other extremity of said second elongated member opposite to said one extremity are connected to one another, and second extremities of two of said four elongated cavities respectively belonging to said two elongated members and adjacent to said support are connected to one another, while second extremities of remaining two of said elongated cavities respectively include two pressure receiving ports;
c) a liquid column contained within said two of said four elongated cavities and filling connected portions of said two of said four elongated cavities;
d) means for inducing flexural vibrations of said first and second elongated members; and
e) means for detecting natural frequencies of the flexural vibrations of said first and second elongated members, wherein differential value between two pressures respectively connected to said two pressure receiving ports is determined from said natural frequencies 13. A device for measuring pressure comprising in combination:
a) a first deformable pressure receiving member receiving a first pressure, said first pressure creating a deformation of said first deformable pressure receiving member in a first direction;
b) a second deformable pressure receiving member receiving a second pressure, said second pressure creating a deformation of said second pressure receiving member in a second direction generally opposite to said first direction;
c) a linkage means linking a deformable portion of said first deformable pressure receiving member and a deformable portion of said second deformable pressure receiving member to one another;
d) a vibrating element with a displaceable member having a resonance frequency of natural vibration that is a function of position of said displaceable member, wherein said displaceable member is coupled to the displacement of said linkage, whereby the displacement of said linkage means is determined from the resonance frequency; and
e) means for inducing the natural vibration of said vibrating element, and means for detecting the resonance frequency of the natural vibration as a measure of differential value between said first and second pressures.

* * * * *